(12) United States Patent
Drake

(10) Patent No.: US 7,368,059 B2
(45) Date of Patent: May 6, 2008

(54) METHOD FOR PREFERENTIALLY REMOVING MONOVALENT CATIONS FROM CONTAMINATED WATER

(75) Inventor: Ronald Neil Drake, Helena, MT (US)

(73) Assignee: Drake Engineering Incorporated, Helena, MT (US)

( * ) Notice: Subject to any disclaimer, the term of this patent is extended or adjusted under 35 U.S.C. 154(b) by 28 days.

(21) Appl. No.: 10/774,819

(22) Filed: Feb. 9, 2004

(65) Prior Publication Data

US 2006/0261010 A1    Nov. 23, 2006

(51) Int. Cl.
*C02F 1/42*     (2006.01)

(52) U.S. Cl. ........................ 210/676; 210/681

(58) Field of Classification Search ................ 210/670, 210/675, 676, 681, 687
See application file for complete search history.

(56) References Cited

U.S. PATENT DOCUMENTS

| | | | |
|---|---|---|---|
| 1,604,649 A | 10/1926 | Manning |
| 1,608,661 A | 11/1926 | Nordell |
| 1,707,302 A | 4/1929 | Godsey |
| 1,740,199 A | 12/1929 | Nordell |
| 2,222,828 A | 11/1940 | Guthrie |
| 2,273,557 A | 2/1942 | Bonotto |
| 2,556,480 A | 6/1951 | Miller |
| 2,585,491 A | 2/1952 | Olsen |
| 2,585,492 A | 2/1952 | Olsen |
| 2,614,133 A | 10/1952 | Ockert |
| 2,631,727 A | 3/1953 | Cichelli |
| 2,666,500 A | 1/1954 | Cahn et al. |
| 2,671,714 A | 3/1954 | McIlhenny et al. |
| 2,673,176 A | 3/1954 | Whitney |
| 2,679,539 A | 5/1954 | McKay |
| 2,696,304 A | 12/1954 | Gilmore |
| 2,696,305 A | 12/1954 | Slover |
| 2,731,149 A | 1/1956 | Findlay |
| 2,744,840 A | 5/1956 | Daniels et al. |
| 2,767,140 A | 10/1956 | Fitch |
| 2,773,028 A | 12/1956 | Monet |
| 2,815,322 A | 12/1957 | Higgins |
| 2,852,464 A | 9/1958 | Nordell |
| 2,866,827 A | 12/1958 | Jurgeleit et al. |

(Continued)

OTHER PUBLICATIONS

Perry's Chemical Engineers' Handbook, 7th ed., 1997, Chapter 16, p. 14, McGraw-Hill, United States of America.

(Continued)

*Primary Examiner*—Matthew O Savage
(74) *Attorney, Agent, or Firm*—Sean R. O'Dowd

(57) ABSTRACT

A process and apparatus for continuously removing ions from solution in proportion to their prevalence in solution using an ion exchange media. The process comprises: (a) mixing fresh or regenerated ion exchange media and a feed solution containing diverse ions; (b) reacting the resulting slurry to produce a product slurry comprised of loaded ion exchange media and stripped product solution; (c) separating the loaded ion exchange media from the product slurry; (d) regenerating the loaded ion exchange media by counter current contact with a regenerant; and (e) conducting the process steps continuously and concurrently, whereby a continuous circuit is produced for dosing, loading, separating, and regenerating the ion exchange media, and whereby more concentrated ions are preferentially depleted in the product solution. An apparatus particularly adapted to practice the process and to treat sodic water is also provided.

9 Claims, 1 Drawing Sheet

U.S. PATENT DOCUMENTS

| | | |
|---|---|---|
| 2,881,127 A | 4/1959 | Hetzel |
| 2,951,036 A | 8/1960 | Bodkin et al. |
| 2,959,542 A | 11/1960 | Pye et al. |
| 2,963,431 A | 12/1960 | Dorn et al. |
| 2,985,589 A | 5/1961 | Broughton et al. |
| 3,002,922 A | 10/1961 | Baddour |
| 3,019,079 A | 1/1962 | Donohue |
| 3,084,120 A | 4/1963 | Cecil et al. |
| 3,152,072 A | 10/1964 | Yomiyama et al. |
| 3,193,498 A | 7/1965 | Platzer et al. |
| 3,200,067 A | 8/1965 | Levendusky |
| 3,201,491 A | 8/1965 | Stine et al. |
| 3,207,577 A | 9/1965 | Mizuma |
| 3,215,624 A | 11/1965 | Frazer et al. |
| 3,231,492 A | 1/1966 | Stine et al. |
| 3,268,605 A | 8/1966 | Boyd, Jr. |
| 3,298,950 A | 1/1967 | Mindler |
| 3,311,552 A | 3/1967 | Staats |
| 3,378,339 A | 4/1968 | Yamashiki |
| 3,403,097 A | 9/1968 | Yamashiki |
| 3,679,581 A * | 7/1972 | Kunz .................. 210/676 |
| 3,956,115 A | 5/1976 | Arion |
| 3,993,562 A | 11/1976 | Kashiwabara |
| 4,035,292 A | 7/1977 | Himsley |
| 4,070,281 A | 1/1978 | Tagashira |
| 4,085,042 A | 4/1978 | Misumi |
| 4,087,357 A | 5/1978 | Barrett |
| 4,088,563 A | 5/1978 | Marquardt |
| 4,181,605 A | 1/1980 | Braswell |
| 4,202,737 A | 5/1980 | Shimizu |
| 4,228,001 A | 10/1980 | Carlson |
| 4,229,292 A | 10/1980 | Mori et al. |
| 4,246,355 A | 1/1981 | Bolton et al. |
| 4,279,755 A | 7/1981 | Himsley |
| 4,412,866 A | 11/1983 | Schoenrock |
| 4,412,923 A | 11/1983 | Capitani et al. |
| 4,427,639 A | 1/1984 | Himsley |
| 4,448,693 A | 5/1984 | Kiehling et al. |
| RE31,687 E | 9/1984 | Himsley |
| 4,563,337 A | 1/1986 | Kim |
| 4,604,209 A | 8/1986 | Himsley |
| 4,645,595 A | 2/1987 | Kim et al. |
| 4,652,352 A | 3/1987 | Saieva |
| 4,661,258 A | 4/1987 | Phillips |
| 4,693,818 A | 9/1987 | Terrien et al. |
| 4,740,310 A | 4/1988 | Dickey |
| 4,775,484 A | 10/1988 | Schmidt et al. |
| 4,808,317 A | 2/1989 | Berry et al. |
| 4,842,744 A | 6/1989 | Schade |
| 4,864,012 A | 9/1989 | Britt |
| 4,906,361 A | 3/1990 | Arnaud |
| 4,923,615 A | 5/1990 | Mehmet |
| 4,923,616 A | 5/1990 | Hirata et al. |
| 5,066,371 A | 11/1991 | DeVoe et al. |
| 5,124,043 A | 6/1992 | Arnaud |
| 5,126,056 A | 6/1992 | Carlson |
| 5,156,736 A | 10/1992 | Schoenrock |
| 5,232,953 A | 8/1993 | Johnson |
| 5,531,902 A | 7/1996 | Gallup |
| 5,534,153 A | 7/1996 | Scott |
| 5,547,551 A | 8/1996 | Bahar et al. |
| 5,580,445 A | 12/1996 | Iwatsuka et al. |
| 5,580,461 A | 12/1996 | Cairns et al. |
| 5,614,100 A | 3/1997 | Gallup |
| 5,707,514 A | 1/1998 | Yamasaki et al. |
| 5,736,052 A | 4/1998 | Concklin |
| 5,772,891 A | 6/1998 | Yamasaki et al. |
| 6,059,974 A | 5/2000 | Scheurman, III |
| 6,228,257 B1 | 5/2001 | Arnaud |
| 6,334,956 B1 | 1/2002 | Hanemaaijer |
| 6,340,427 B1 | 1/2002 | Fukui et al. |
| 6,375,851 B1 | 4/2002 | Sterling et al. |
| 6,563,010 B1 | 5/2003 | Liepa |
| 6,576,137 B1 | 6/2003 | Ma |

OTHER PUBLICATIONS

Kirk-Othmer's Encyclopedia of Separation Technology, vol. 2, 1997, pp. 1074-1076, John Wiley & Sons, New York, U.S.A.

Bill Courtney, et al., Report on Coal Bed Natural Gas Produced Water Treatment Utilizing Continuous Countercurrent Ion EXchange (CCIX) Technology, Sep. 17, 2003, 6 pages, EMIT Wa.

* cited by examiner

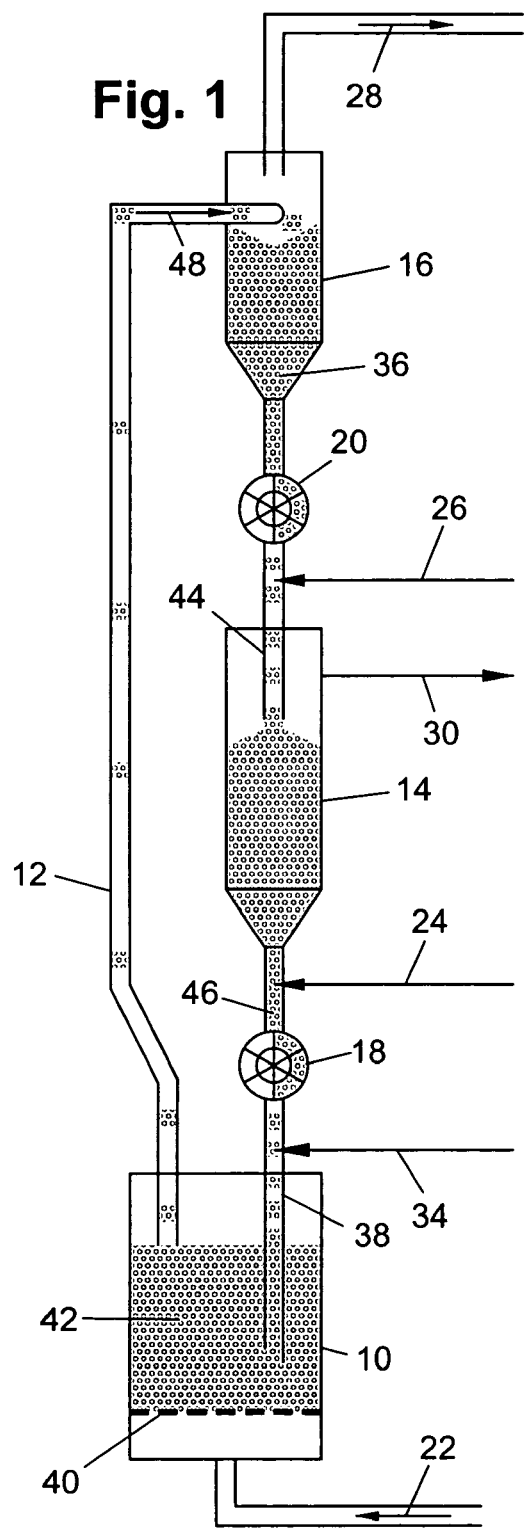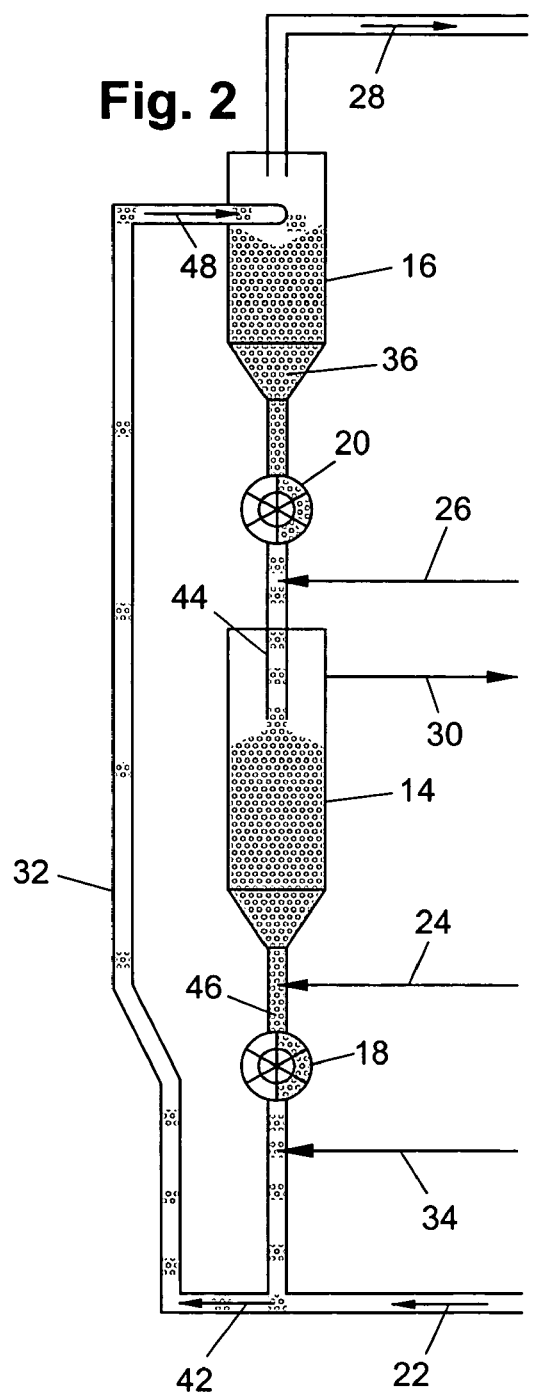

METHOD FOR PREFERENTIALLY REMOVING MONOVALENT CATIONS FROM CONTAMINATED WATER

FIELD OF THE INVENTION

The present invention relates to continuous ion exchange, and more specifically relates to the partial removal of diverse ions in proportion to their respective concentrations in solution.

BACKGROUND OF THE INVENTION

Many surface and groundwater resources are classified as sodic or saline-sodic. Sodic water and saline-sodic water both contain high concentrations of monovalent sodium ions in solution relative to lower concentrations of divalent calcium and magnesium ions. Sodic water is defined as water having a sodium adsorption ratio (SAR) value greater than 15 where the SAR value is defined by the following equation:

$$SAR = \frac{[Na+]}{\sqrt{\frac{[CA^{2+}]+[Mg^{2+}]}{2}}}$$

Where the concentration terms have units of milliequivalents per liter. Sodic water is found in many arid and semi-arid areas of the world and is also a high volume waste of fossil fuel production. To render sodic water suitable for beneficial use in agriculture, the concentration of the predominant monovalent cations must be reduced without substantially reducing the concentration of the divalent cations in solution.

As described in Perry's Chemical Engineers' Handbook, 7$^{th}$ ed., chapter 16, page 14, and in Kirk-Othmer's Encyclopedia of Separation Technology, Vol. 2, pages 1074-1076, commercially available ion exchange media are selective and will remove divalent and multivalent cations in preference to monovalent cations. When ion exchange media are employed in conventional fixed or moving bed reactors, divalent cations will be removed to a greater extent than the monovalent cations. Divalent cations, even in low concentrations, will replace monovalent cations on the ion exchange media. Consequently, as shown by EMIT Water Discharge Technology, Sep. 17, 2003, commercially available produced water treatment schemes that use cation exchange media for sodium removal also quantitatively remove calcium and magnesium. Restoring divalent cations to the solution adds to process complexity and requires conditioning of treated water by chemical addition or mineral contacting plus blending of treated and untreated water streams.

Selectivity of cation exchange media for calcium and magnesium over sodium and potassium has been the major impediment to simple, economical, single contact treatment of sodic water by ion exchange.

SUMMARY OF THE INVENTION

In one embodiment of the present invention, a continuous selective ion exchange process of the present invention removes the above-described impediment and provides a simple and economical treatment of sodic water by ion exchange.

In another embodiment, the invention may be characterized as a process for continuously removing ions from solution in proportion to their prevalence in solution using a continuous circuit for dosing, loading, separating, and regenerating ion exchange media, whereby sodic water can be rendered non-sodic in a single pass through a reaction volume.

A continuous selective ion exchange process in accordance with an aspect of the present invention provides a simple method for controlled, continuous, removal of diverse ions in solution in proportion to their respective concentrations in solution. The process can be used to selectively remove monovalent cations in solution when using commercially available ion exchange media that is selective for divalent cations. Process equipment is simple, easily scaled, and suitable for modular assembly and application. These capabilities and characteristics render the continuous selective ion exchange process particularly suitable for treatment of sodic and saline-sodic waters such as those produced during fossil fuel exploration and development, and as found naturally in many arid regions of the world Accordingly, there are several objects and advantages of the present invention some of which are:

(a) to provide a selective ion exchange process that will allow preferential removal of monovalent cations from solutions containing both monovalent and divalent cations, when using commercially available ion exchange media that exhibits selectivity for divalent cations, (b) to provide a simple continuous ion exchange process for treating sodic water, for beneficial use, using commercially available cation exchange media, (c) to provide an ion exchange process for treating sodic water in a single pass through an ion exchange reactor, (d) to provide an ion exchange process for removing ions from solution in proportion to their prevalence in solution despite inherent ion exchange media selectivity, (e) to provide a method and apparatus for controlling the duration of contact between ion bearing solution and ion exchange media during continuous ion exchange, (f) to provide a method and apparatus for continuously contacting ion exchange media and ion bearing solution at predetermined stoichiometric ratios, (g) to provide a method and apparatus for continuously regenerating and dosing ion exchange media, (h) to provide a method and apparatus for continuously controlling the degree of loading and regeneration of ion exchange media, (i) to provide a method and apparatus to reduce consumption of ion exchange media due to breakage and attrition.

The foregoing objects and advantages are merely a representation of the full scope of the present invention. Further objects and advantages are to provide a sodic water treatment process and apparatus that can be easily and reliably scaled to any desired size, and that is simple and inexpensive to manufacture and operate, and is suitable for unattended operation in remote, harsh environments. Still further objects and advantages will become apparent from a consideration of the ensuing description and drawings.

BRIEF DESCRIPTION OF THE DRAWINGS

Various additional objects and advantages and a more complete understanding of the present invention are apparent and more readily appreciated by reference to the following Detailed Description and to the appended claims when taken in conjunction with the accompanying Drawings wherein:

FIG. 1 is a material flow and major equipment arrangement diagram for a preferred embodiment of the continuous selective ion exchange process.

FIG. 2 is a material flow and major equipment arrangement diagram for a simplified embodiment of the continuous selective ion exchange process.

DETAILED DESCRIPTION

Kinetic studies with ion exchange media dispersed in ion bearing solutions have shown that the rate of removal of cations is proportional to the square root of the product of the cation concentration and the concentration of unused ion exchange media in the reaction volume. The form of the kinetic equation for removal of target ionic species is:

$$r_A = k_A (C_{IX} C_A)^{0.5}$$

Where $r_A$ is the removal rate of species "A", $k_A$ is the rate constant and $C_{IX}$ and $C_A$ are the respective concentrations of the unused ion exchange media and target ions in solution. Similar expressions can be written for each ionic species in solution, and the relative removal rate for any two species at a given ion exchange media concentration is:

$$\frac{r_A}{r_B} = \frac{k_A}{k_B} \left( \frac{C_A}{C_B} \right)^{0.5}$$

Since the rate constants $k_A$ and $k_B$ depend largely on the reaction conditions and transport properties of the fluid, which are the same for both ionic species, the rate constants are approximately equal. Therefore, the initial relative rate of removal of two ionic species is approximated by the square root of the ratio of their concentrations in solution. For example, if sodium ions are present at nine times the concentration of calcium ions in solution, fresh ion exchange media will remove sodium ions at a rate approximately three times as fast as it will remove the calcium ions.

The hereinabove discussed equations show that the rate of removal of a specific ionic species is a function of the stoichiometric ratio of the concentration of unused ion exchange media capacity and the concentration of the target ions in solution. The most rapid removal of a target ion will occur when fresh ion exchange media is well mixed with solution exhibiting a high concentration of the target ion. As exchange sites on the media are filled and the media approaches full loading, the rate of removal for all species declines and the relative selectivity of the media for specific ionic species controls its equilibrium loading.

Consequently, preferential removal of the more concentrated species can be accomplished by reducing the contact time, increasing the media-to-ion stoichiometric ratio, and controlling the degree of mixing of fresh or partially loaded ion exchange media and the ion bearing solution. The present invention is designed to provide simple and easy control of media-solution contact time, media-solution stoichiometric ratio, and media-solution mixing as needed to take advantage of the aforementioned kinetic phenomena, and thereby allow preferential removal of monovalent ionic species using commercially available ion exchange media that exhibit selectivity for divalent ionic species.

Methods used to acquire kinetic data for ion exchange reactions and to design reactors based on kinetic data are well known to practitioners having ordinary skill in the art.

DRAWINGS—REFERENCE NUMERALS

| 10 | Fluidized Bed Reactor | 12 | Media Elutriation Line |
|----|----|----|----|
| 14 | Media Regenerator | 16 | Media Separator |
| 18 | Primary Rotary Valve | 20 | Secondary Rotary Valve |
| 22 | Feed Solution | 24 | Fresh Regenerant |
| 26 | Purge Solution | 28 | Product Solution |
| 30 | Spent Regenerant | 32 | Media Transport Line |
| 34 | Fresh Ion Exchange Media | 36 | Loaded Ion Exchange Media |
| 38 | Reactor Standpipe | 40 | Fluid Distributor |
| 42 | Reactant Slurry | 44 | Regenerator Standpipe |
| 46 | Regenerated Ion Exchange Media | 48 | Product Slurry |

Although present devices are functional, they are not sufficiently accurate or otherwise satisfactory. Accordingly, a system and method are needed to address the shortfalls of present technology and to provide other new and innovative features.

Referring first to FIG. 1, a continuous selective ion exchange process is performed in an apparatus comprised of a fluidized bed reactor 10 equipped with a fluid distributor 40, a media elutriation line 12, a media separator 16 and a media regenerator 14. A primary rotary valve 18 regulates flow rate of regenerated ion exchange media 46 particles from the media regenerator 14 to the fluidized bed reactor 10 through a reactor standpipe 38. A secondary rotary valve 20 regulates flow rate of loaded ion exchange media 36 particles from the media separator to the media regenerator 14. Feed solution 22, fresh regenerant 24, purge solution 26, and fresh ion exchange media 34 are fed to the process at appropriate locations. Likewise, product solution 28, and spent regenerant 30 are discharged from the process at appropriate locations.

Referring next to FIG. 2, the simplified embodiment of a continuous selective ion exchange process uses a media transport line 32 and omits the separate ion exchange reactor 10 shown in FIG. 1.

During operation of the continuous selective ion exchange process, ion exchange media are continuously circulated through the fluidized bed reactor 10, media elutriation line 12, media separator 16, and media regenerator 14. Target ions are removed from feed solution in the ion exchange reactor 10 and during transport through the elutriation line 12. The reaction volume of a fluidized bed reactor can be increased or reduced by simple adjustment of the vertical position of the lower end of the media elutriation line 12. Placing the lower end of the media elutriation line closer to the fluidized bed reactor's 10 fluid distributor 40 reduces the reaction volume and, therefore, reduces the contact time between the ion exchange resin and the feed solution 22. If the desired ion exchange reactions are sufficiently fast, the fluidized bed reactor 10 shown in FIG. 1 may be omitted and, as shown in FIG. 2, the ion exchange reaction will be accomplished in the media transport line 32.

In the embodiment shown in FIG. 1, feed solution is brought into contact with the fresh or regenerated ion exchange media 46 in the fluidized bed reactor to produce a reactant slurry 42. Ion exchange reactions occur in the fluidized bed reactor 10 and the elutriation line 12 yielding a product slurry 48 that flows through the elutriation line 12 and into the media separator 16.

In the embodiment shown in FIG. 2, feed solution 22 is directly mixed with regenerated or fresh ion exchange media 46 to form the reactant slurry 42. Ion exchange reactions occur in the media transport line 32 that discharges product slurry 48 into the media separator 16.

The media separator 16 recovers ion exchange media from the product slurry and discharges clarified product solution 28, which is the primary process product. Thus, the feed solution is treated in one pass through the reaction volume. Media separation may be accomplished by any method that will separate the product slurry components into saturated settled media particles plus clarified product solution. Preferred methods of separating ion exchange media and product solution are gravity settling, straining, and cyclone separation because these methods of separation are simple, have no moving parts, and minimize mechanical breakage and attrition of the media.

Loaded ion exchange media 36 are transferred from the media separator 16 into the regenerator 14 by means of gravity transport through the secondary rotary valve 20 and via the regenerator standpipe 44. The media transfer rate through the secondary rotary valve 20 is proportional to the secondary rotary valve 20 rotation speed.

In the regenerator 14, the ion exchange media are continuously regenerated by counter current contact with fresh regenerant 24. Fresh regenerant 24 is introduced near the bottom of the regenerator 14 and flows upward counter to the descending ion exchange media. The regenerator 14 is designed so that the upward superficial velocity of the regenerant 24 is less than the superficial fluidizing velocity of the loaded ion exchange media. Spent regenerant 30 is withdrawn from the fluid filled headspace above the bottom end of the regenerator standpipe 44 and in the upper portion of the regenerator 14. Optionally, a purge solution 26 may be introduced just below the secondary rotary valve 20 to minimize contamination of the product solution 28 by spent regenerant 30 that might otherwise be contained in the pocket flow and leakage through the secondary rotary valve 20.

Regenerated ion exchange media 46 are transferred from the regenerator 14 into the fluidized bed reactor 10 by means of gravity transport through the primary rotary valve 18 and via the reactor standpipe 38. The ion exchange media transfer rate through the primary rotary valve 18 is proportional to the primary rotary valve rotation speed.

By the process hereinabove discussed ion exchange media are continuously cycled through the fluidized bed reactor 10, media elutriation line 12, media separator 16, media regenerator 14, and back to the fluidized bed reactor 10.

The inventory of ion exchange media in the process circuit is initially charged or replenished through the fresh ion exchange media 34 line into the reactor standpipe and between the primary rotary valve 18 and the fluidized bed reactor 10.

The primary and secondary rotary valves 18 and 20 are preferably designed or operated such that the rotation speed of the secondary rotary valve 20 exceeds the rotation speed of the primary rotary valve 18 by a predetermined value. With this mode of operation, the primary rotary valve speed is used to easily regulate the overall ion exchange media circulation rate and, thereby, adjust the media-to-solution stoichiometric ratio as needed to remove target exchangeable ions in the feed solution.

In the simplified embodiment (FIG. 2) of the continuous selective ion exchange process, ion exchange media discharged from the primary rotary valve 18, or introduced via the fresh ion exchange media 34 line, are directly entrained by the feed solution 22. Desired ion exchange reactions occur during transport of the resulting slurry 42 in the media transport line 32. The media transport line 32 may be provided in alternate configurations, (e.g., loops, coils, spirals, etc.) as needed to accomplish slurry transport, to control mixing of media and solution, and to provide optimum contact time for ion exchange. No separate ion exchange reactor is used. In all other respects, operation of the simplified embodiment of the instant process is the same as hereinabove discussed for the preferred embodiment.

Thus, the reader will see that a continuous selective ion exchange process in accordance with one or more aspects of the present invention provides a simple method for controlled, continuous, removal of diverse ions in solution in proportion to their respective concentrations in solution. The process can be used to selectively remove monovalent cations in solution when using commercially available ion exchange media that is selective for divalent cations. This process equipment is simple, easily scaled, and suitable for modular assembly and application. These capabilities and characteristics render the continuous selective ion exchange process particularly suitable for treatment of sodic and saline-sodic waters such as those produced during fossil fuel exploration and development, and as found naturally in many arid regions of the world, although application to other industries is also contemplated.

The foregoing description should not be construed as limiting the scope of the invention, but rather as an exemplification of preferred embodiments thereof. Other variations are possible. For example, orientation of major equipment items in other than a vertical configuration is not required if the rotary valves 18, 20 are replaced by appropriate slurry pumps. A variety of methods, such as centrifugation, cyclone separation, filtration, straining, and settling may be used to accomplish the media separation step. Depending on scale, different regenerator configurations and internals may be used to ensure efficient counter current regeneration of media with regenerant solution. A stirred tank or other type of ion exchange reactor may be substituted for the fluidized bed ion exchange reactor. The media transport tube 32 may be furnished in many (banked tubes, loops, coils, spirals, etc.) alternative configurations and lengths. The process may be applied to accomplish either cation or anion removal, or for chemical adjustment of solution ionic composition, ionic strength, or pH. More than one process arrangement may be employed in sequence to achieve concurrent continuous selective exchange of both cations and anions.

Accordingly, the scope of the invention should be determined not by the embodiments illustrated, but by the appended claims and their legal equivalents.

I claim:

1. A method for purifying contaminated water comprising:

receiving the contaminated water, the contaminated water including a greater concentration of monovalent cations than divalent cations;

mixing the contaminated water with an ion exchange media which is more selective for the divalent cations than the monovalent cations;

removing the monovalent cations, so as to leave divalent cations in treated water by controlling the amount of time the ion exchange media and the contaminated water are mixed together;

separating the ion exchange media from the treated water;

regenerating the ion exchange media that is separated from the treated water; and returning the regenerated ion exchange media to said mixing step.

2. The method of claim 1 wherein removing monovalent cations from the contaminated water is carried out while transporting the contaminated water and the ion exchange media to a separator.

3. The method of claim 2 wherein transporting the contaminated water includes substantially continuous movement of the contaminated water and the ion exchange media to the separator.

4. The method of claim 2 wherein the rate of the transporting the ion exchange media is controlled by a continuously moving rotary valve.

5. The method of claim 2, wherein the transporting includes cocurrently transporting the contaminated water and the ion exchange media to a separator.

6. The method of claim 1 wherein removing monovalent cations is carried out in a reaction volume, the reaction volume including a volume of a fluidized bed reactor.

7. The method of claim 6 further comprising reducing a contact time between the ion exchange media and the divalent cations by adjusting the reaction volume.

8. The method of claim 1, wherein the step of removing monovalent cations includes controlling a stoichiometric ratio of the concentration of un-used ion exchange media to the concentration of monovalent cations in the contaminated water so as to leave the divalent cations in the treated water.

9. The method of claim 1, wherein the separating is carried out by a hydrocyclone.

* * * * *